(12) United States Patent
Donetti et al.

(10) Patent No.: US 7,155,094 B2
(45) Date of Patent: Dec. 26, 2006

(54) WATER-RESISTANT TELECOMMUNICATION CABLE

(75) Inventors: Raffaella Donetti, Ghemme (IT); Massimiliano Pavan, Verdello (IT); Giovanni Brandi, Milan (IT); Mauro Maritano, Monza (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/540,830

(22) PCT Filed: Dec. 27, 2002

(86) PCT No.: PCT/EP02/14773

§ 371 (c)(1),
(2), (4) Date: Jan. 3, 2006

(87) PCT Pub. No.: WO2004/059360

PCT Pub. Date: Jul. 15, 2004

(65) Prior Publication Data

US 2006/0127015 A1    Jun. 15, 2006

(51) Int. Cl.
*G02B 6/44* (2006.01)
(52) U.S. Cl. ........................ 385/102; 385/100
(58) Field of Classification Search ......... 385/102
See application file for complete search history.

(56) References Cited

U.S. PATENT DOCUMENTS

| | | | |
|---|---|---|---|
| 3,607,812 A | 9/1971 | Takigawa et al. | |
| 3,997,489 A | 12/1976 | Coker | |
| 4,323,492 A | 4/1982 | Zimmermann et al. | |
| 4,469,837 A | 9/1984 | Cattaneo | |
| 4,542,178 A | 9/1985 | Zimmermann et al. | |
| 4,611,019 A | 9/1986 | Lutzmann et al. | |
| 2002/0041744 A1* | 4/2002 | Anelli et al. | 385/112 |

FOREIGN PATENT DOCUMENTS

| | | |
|---|---|---|
| EP | 0 635 545 | 1/1995 |
| EP | 0 860 471 | 8/1998 |
| GB | 2 340 835 | 3/2000 |
| WO | WO 00/21098 | 4/2000 |
| WO | WO 03/056576 A1 * | 7/2003 |

* cited by examiner

*Primary Examiner*—Michelle Connelly-Cushwa
*Assistant Examiner*—Chris Chu
(74) *Attorney, Agent, or Firm*—Finnegan, Henderson, Farabow, Garrett & Dunner, L.L.P.

(57) ABSTRACT

A water-resistant telecommunication cable is disclosed comprising a solid and compact element surrounding at least one optical transmitting element, wherein the element is made from a vinyl alcohol/vinyl acetate copolymer having a hydrolysis degree of about 60% to about 95% and a polymerization degree higher than about 2,500; at least a first solid plasticizer having a melting point between 50° and 110° C., and a second solid plasticizer having a melting point equal or higher than 140° C., in an amount of about 10–30 and 1–10 parts by weight per hundred parts by weight of the copolymer, respectively; the water-soluble polymer material showing: a complex modulus (G*) equal to or higher than 2.5 $10^6$ Mpa; a ratio of the viscous modulus to the elastic modulus (tan δ) equal to or lower than 2.30; and a glass transition temperature (Tg) of about 20° to about 35° C.

32 Claims, 1 Drawing Sheet

WATER-RESISTANT TELECOMMUNICATION CABLE

CROSS REFERENCE TO RELATED APPLICATION

This application is a national phase application based on PCT/EP2002/014773, filed Dec. 27, 2002, the content of which is incorporated herein by reference.

BACKGROUND OF THE INVENTION

1. Field of the Invention

The present invention relates to a water-resistant telecommunication cable, in particular an optical fibre cable, comprising a solid and compact element, in particular a buffer tube, housing a loose transmitting element.

The present invention also relates to a method for maintaining loose the transmitting element of the cable of the invention upon the extrusion thereof and to the use of a water-soluble polymer material, comprising a vinyl alcohol/vinyl acetate (referred to hereinbelow as VA-VAc copolymer and generally identified in the art as PVA), for the preparation of the solid and compact element in order to maintain loose the transmitting element upon extrusion of the cable.

2. Description of the Related Art

In extruding polyvinyl alcohol (PVA) several problems have been generally encountered. It is known that the melting point of PVA is higher than its decomposition temperature and that the risk of cross-linking is high. The extrudability of PVA has hitherto been sought to be improved, e.g., by the addition of plasticizers, commonly a polyhydric alcohol and lubricants such as stearic acid; the result being however of limited utility because the use of PVA requires to work within a very narrow temperature range. Also the fugitive nature of the plasticizer could generate a tendency to stick thereby interfering with a smooth extrusion. The kind and amount of the plasticizer are also important to get a composition neither too tacky in use and nor too soft for the manufacturing process.

U.S. Pat. No. 3,607,812 discloses a method of manufacturing a PVA film insoluble in water at a temperature below 40° C., by adding 5–13 parts by weight of a polyhydric alcohol plasticizer such as glycerine, triethylene glycol, triethylol propane, to 87–95 parts by weight of a fully hydrolysed PVA; the film is useful for making hospital bags or the packaging material of detergents and agricultural chemicals.

U.S. Pat. No. 3,997,489 discloses a PVA composition of improved melt flow characteristics, the PVA having a degree of polymerisation of about 500–2,000 and a degree of hydrolysis of at least about 88%; the composition comprises 0–20% of a plasticizer, about 0.5–5% of a wax and about 0.5–5% of an ethylene polymer, all amounts being based upon the weight of the PVA-plasticizer blend. The optional presence of a plasticizer is said to enhance the improvement of the melt flow characteristics.

GB 2,340,835 discloses an extrudable PVA composition comprising a blend of partially and fully hydrolysed PVAs, a lubricant such as a fatty acid amide and, optionally, up to 20 wt % of a plasticizer such as glycerine, ethylene glycol, etc. The composition is said to be suitably extruded on current unmodified extrusion lines without processing problems such as thermal degradation and high temperature cross-linking.

U.S. Pat. Nos. 4,323,492 and 4,542,178 disclose a tack-free granular PVA composition, and a process for the manufacture thereof, capable of being processed thermoplastically. The composition comprises a 10–30 wt % of a plasticizer, f.i. glycerol, polyethylene glycol, trimethylol propane, an amount of water insufficient to dissolve the PVA granules, and 2–12 wt % of a fine particle high molecular weight organic compound, f.i. starch, cellulose, casein, amounts being referred to the unplasticized PVA granules.

U.S. Pat. No. 4,611,019 discloses a melt extrudable composition consisting essentially of a mixture of a PVA homopolymer, having a degree of hydrolysis greater than 95% and a molecular weight range which spans the solution viscosity range of 2 to 30 cP at 4% concentration in water at 20° C., and 7–15 wt % of a plasticizer such as aromatic sulphonamides, polyols, etc., and 0.5–4.5 wt % of a polyamide, amounts being based on the PVA. The composition can be extruded and is particularly useful, as a film, for protecting oxygen sensitive products.

EP-A-0635545 discloses a melt extrudable PVA composition, especially useful for injection moulding of articles, in particular personal care articles which are flushable and biodegradable. The composition consists essentially of a blend of partially (30–50%) and fully hydrolysed (50–70%) PVAs, a solid (1–10%) and a liquid (8–20%) plasticizer, the amount of the plasticizers being referred to PVA. The PVA blend is said to be used because only fully hydrolysed PVA would give the moulded articles an excessive brittleness which would be offset by using an excess of plasticizer which, in its turn, would lead to lower water resistance; on the other hand, using an all partially hydrolysed PVA composition would result to be too tacky in use and too soft for the manufacturing process. Preferred plasticizers are polyhydric alcohols, the preferred solid ones being sorbitol, mannitol, pentaerythritol or dipentaerythritol and the preferred liquid ones being glycerol, ethylene glycol and polyethylene glycol. Further, an exudation of the liquid plasticizer on the surface of the article, and upon ageing, especially with fully hydrolysed PVA, is noted at greater than 10 wt % solid plasticizer and low levels of liquid plasticizer.

In order to prevent a PVA powder from originating coarse lumps of a degraded and partially cross-linked material upon extrusion, U.S. Pat. No. 4,469,837 discloses a thermoplastic extrudable PVA composition comprising a dry mixture of PVA, preferably having a hydrolysis degree greater than 70% and a degree of polymerisation of 500–2500, with one or more solid monomeric polyhydroxylated alcohol which, as such or in mutual admixture, exhibit the main melting point peak ranging from 160° to 230° C., such as pentaerythritol, bipentaerythritol and trimethylolethane, preferably in an amount of 10–50 parts per 100 parts of the PVA. The addition of small percentages of other liquid alcohols, such as glycerols or glycols, is further contemplated so to maintain the melting point of the polyhydroxylated alcohol(s) within the above mentioned temperature range.

EP-A-0860471 discloses a three stages process for the preparation of a mouldable and extrudable solid thermoplastic composition comprising partially or totally hydrolysed PVA, 1–10 parts of one or more solid plasticizers, 5 to 30 parts of a liquid mixture containing one or more hydroxylated organic compound, water and at least a salt of an alkaline or alkaline earth metal, 15–30 parts of a solid mixture containing solid polyhydroxylated alcohols, glycols and glycolic ethers, liquid alkanolamines, mineral or organic acids, hydrated inorganic salts stabilizers, other compatible polymers and/or copolymers having low molecular weight and possible mineral charges. The resulting composition is reported to show a good plasticization of the PVA in the transformation equipments and a good workability constancy in time and results to be transformable in manufactures provided with good flexibility. The composition obtained by the disclosed process is useful for the production of granulates, flat or tubular films, moulded articles of manufacture, plates or films coextruded with polyolefins, polyvinyl chloride, polystyrene or polyamides.

WO00/21098 discloses a water-resistant cable, particularly an optical fibre cable, comprising a longitudinal cavity extending along the length of the cable, at least one optical fibre housed inside the cavity and a solid and compact element associated with the cavity, said element being made of a water-soluble material which, upon contact with water, dissolves itself, at least partially, and forms a viscous solution capable of stopping the longitudinal flow of water along such element. Solid and compact elements of this kind allow to avoid the use, or at least substantially reduce the amount, of conventional water-blocking means, such as grease-like material, water-swellable powders and the like. Said solid and compact element is, particularly, a buffer tube, preferably made of a VA-VAc copolymer having a hydrolysis degree of from about 50% to 95%, preferably from 70% to about 90%. This copolymer, in the presence of relative humidity percentages of less than 75–80%, does not show any phenomena of surface stickiness caused by the partial absorption of water. The use of conventional plasticizers, in an amount of at least 5% of the total weight of the polymer material composition, is further disclosed.

The addition of plasticizers to the polymer material, generally in an amount of about 1% to about 30% of the weight of the latter, is well known, in the field, in order to improve the processability and final flexibility of the material; it is further known that the plasticizers are also capable of increasing the ability of the water-soluble polymer material to absorb water.

EP01130960 discloses a water-resistant telecommunication cable, particularly an optical fibre cable comprising an elongated element housing at least one transmitting element comprising a water-soluble polymer composition which comprises a VA-VAc copolymer having a hydrolysis degree of from about 60% to about 95%, a plasticizer, and a hydrolysis stabiliser comprising a chelant. The presence of the stabiliser allows to reduce the increase of the hydrolysis degree of the VA-VAc copolymer upon ageing, thus maintaining the desired water-blocking properties of the VA-VAc copolymer. Further, there is disclosed the addition of a plasticizer such as glycerol, sorbitol, trimethylolpropane, low molecular weight polyglycol, such as polyethylene glycol (e.g. di- or tri-ethyleneglycol), pentaerythritol, neopentylglycol, triethanolamine or oxyethylated phosphoric esters, preferably in an amount of from about 5% to about 30% by weight with respect to the weight of VA-VAc copolymer.

The Applicant has now observed that while buffer tubes, as disclosed in WO00/21098, comprising a partially hydrolysed VA-VAc copolymer allow to avoid the use, or at least substantially reduce the amount, of conventional water-blocking means and that while adding a stabiliser, as disclosed in EP01130960, allows to reduce the increase of the hydrolysis degree of the VA-VAc copolymer upon ageing, thus maintaining the desired water-blocking properties of the VA-VAc copolymer, a stickiness of said copolymer is experienced during the estrusion process generating an interference with the transmitting element, f.i. optical fibres, put inside the solid and compact element, such as a buffer tube, of the cable.

Particularly, the Applicant noted that the water-soluble VA-VAc based polymer material resulted to be sticky during its extrusion, regardless of the presence of a stabiliser and a plasticizer and of the fact that the water-soluble polymer material is extruded alone or in combination with the water-insoluble polymer materials commonly used for the outer layer of a solid and compact element, such as a the buffer tube, of a transmission cable.

The Applicant observed that, during the extrusion of, f.i., a buffer tube for an optical fibre cable, the stickiness of the water-soluble polymer material, due to the prevailing of the viscous component of the melt, generates a negative interaction with the surface of the optical fibres, this being detectable both co-extruding different polymer materials, which is industrially preferred, and even singly extruding them, although the problem is less evident in the latter case.

In fact, in both cases, the Applicant experienced that sticking phenomena affect the quality of the resulting transmission cable regardless of possible adjusting the common industrial extrusion process by, f.i. slowing the production.

The Applicant has also noted that, extruding the PVA composition disclosed in U.S. Pat. No. 3,997,489, the polyethylene waxes separate from PVA, due to their mutually different polarity, thus slowing the interaction with the water possibly penetrated in the cable and actually making this composition useless as a water-blocking mean aid in a water-resistant communication cable. The same shortcoming has been also experienced by the Applicant with the composition disclosed in GB 2,340,835 where the fatty acid amine separates upon extrusion from PVA, because—once again—of their different polarity.

The Applicant has also observed that using release agents such as oils or powders on, f.i., optical fibres to prevent the above described stickiness, results to be unsuitable to guarantee a regular extrusion process, also because it is cumbersome to uniformly distribute the release agent on the fibres; besides, oils and/or powders move along the optical fibres distributing themselves irregularly this, especially with powders, possibly bringing to a mechanical interference between the tube and fibres.

Further, the solid and compact element, f.i. a buffer tube, housing the transmission element, f.i. an optical fibre, has to be dimensionally stable and regular in order to avoid any interference of the optical fibres with the polymer material comprised in the solid and compact element, during the extrusion step.

The fibers and the plastic material tube enclosing them, proceed for a certain length along the extrusion line, independently from one another. The dimensional stability of the molten state of the water-soluble polymer material and the stickiness phenomena to optical fibres can be observed between the extrusion head and the final collection reel.

When the stickiness phenomena occur, the water-soluble polymer material and optical fibres proceed together and during the coooling step the shrinkage of the water-soluble polymer material cause the macrobending of the optical fibres.

The macrobending gives rise to attenuation phenomena of the transmitted signal, on account of either irregularly distributed pressures on the surface of the transmission element or excessive ringing of the transmission element, both of which being drawbacks which can result in attenuation phenomena of the transmitted signal, even under conditions which would otherwise not be harmful to the functioning of the cable.

Specifically, the stickiness of the water-soluble VA-VAc based polymer material results in potentially damaging the transmission element and, at the same time, does not guarantee the desired and needed stability and regularity upon its extrusion, this further potentially giving rise to attenuation phenomena of the transmitted signal.

SUMMARY OF THE INVENTION

The Applicant has now found that a cable, which has no elements of fluid or pulverulent type for blocking the flow of water i.e. housing a loose transmitting element, shows no stickiness of the water-soluble polymer material comprised therein upon extrusion, such material being extruded either alone or in combination with the water-insoluble polymer materials commonly used for the outer layers of a transmission cable without adjusting or slowing the current extrusion techniques; the cable elements resulting to be dimensionally stable and regular so that no attenuation phenomena of the transmitted signal result to be detectable.

According to a first aspect, the present invention relates to a water-resistant telecommunication cable comprising a longitudinal cavity extending along the length of the cable and a solid and compact element housing at least one transmitting element, wherein the solid and compact element is associated with the cavity and comprises a water-soluble polymer material comprising:

a vinyl alcohol/vinyl acetate copolymer having a hydrolysis degree of about 60% to about 95% and a polymerisation degree higher than about 1,800;

at least a first solid plasticizer, having a melting point between 50° and 110° C., and a second solid plasticizer, having a melting point equal or higher than 140° C., in an amount of about 10–30 and 1–10 parts by weight per hundred parts by weight of the copolymer, respectively;

the water-soluble polymer material showing:

a complex modulus ($G^*$) equal or higher than $2.5 \cdot 10^6$ MPa;

a ratio of the viscous modulus to the elastic modulus (tan δ) equal or lower than 2.30;

a glass transition temperature (Tg) of about 20° to about 35° C.

The solid and compact element comprises, preferably, about 30% by weight or more, particularly about 50% by weight or more, most preferably about 75% by weight or more of the water-soluble polymer material.

The solid and compact element is, preferably, a structural element of the cable and, specifically, a tubular element comprising at least one sheath, made of the water-soluble polymer material, the longitudinal cavity being defined by the inner volume of the tubular element.

Preferably, the tubular element is a single sheath completely made of the water-soluble polymer material or, alternatively, it can be a double layer sheath, the inner layer being made of the water-soluble polymer material and the outer layer being made of a water-insoluble polymer material.

According to a preferred embodiment, the solid and compact element of the cable of the invention is a buffer tube and the transmitting element is an optical fibre.

In another embodiment of the invention, the tubular element is a three-layer sheath, the inner and the outer layers being made of the water-soluble polymer material and the intermediate layer being made of a water-insoluble polymer material.

The vinyl alcohol/vinyl acetate copolymer is, preferably, in an amount of from about 50% to about 95%, particularly from about 60% to about 85% of the total weight of the water-soluble polymer material; the copolymer preferably has a hydrolysis degree of from about 70% to about 92% and a polymerisation degree of about 2,500–3,700, most preferably of about 3,000–3,500.

In the present description, the expression "vinyl alcohol/vinyl acetate copolymer" is meant to comprise modified polyvinyl alcohol including, yet not limited to, the following polymers obtained:

a) by partial etherification of a polyvinyl alcohol (for example by epoxidation by introducing groups such as —($CH_2CH_2$—O—)$_n$—H into the PVA homopolymer chain;

b) by partial esterification of alcohol groups (similarly, a suitable polyester homopolymer can be hydrolysed in order to introduce hydroxyl functions therein);

or c) by block copolymerization thus obtaining, for example, poly(vinyl alcohol-co-polyoxyethylene) from vinyl acetate, polyoxymethylene monomethyl ether and using a diisocyanate or a diepoxide as chain extender.

The VA-VAc copolymer is generally obtained by hydrolysis of polyvinylacetate, by which the acetate groups of the polymer are converted to hydroxy groups. More specifically, the reaction is typically an alcoholysis of polyvinylacetate with a metal (typically sodium) hydroxide as catalyst. The VA-VAc copolymer resulting from the alkaline alcoholysis has mainly a block structure, where blocks formed by sequences of vinyl-acetate groups of formula —$CH_2$—CH($OCOCH_3$)— are alternated to blocks formed by sequences of vinyl-alcohol groups of formula —$CH_2$—CH(OH)—.

For the purposes of the present invention, a VA-VAc copolymer, which can be obtained by partial hydrolysis of the acetate groups of a polyvinyl acetate (PVAc) homopolymer, is particularly preferred.

As regards the degree of hydrolysis of the copolymer, the Applicant has observed that, for a zero degree of hydrolysis (i.e. for polyvinyl acetate homopolymer), the solubility in water is very modest, equal to about 0.01 g/liter at 20° C.

As the degree of hydrolysis increases, the hydrophilic properties of the material increase, along with its solubility, to about 300 g/l for a degree of hydrolysis of about 88%. However, applicant has noticed that a further increase in the degree of hydrolysis results into a corresponding decrease in the solubility of the material in water. In point of fact, in the case of complete hydrolysis of the acetate groups, the polyvinyl alcohol homopolymer obtained has an extremely low solubility (1.43 g/liter at 20° C.), even though the material is still highly hydrophilic.

For the purposes of the present invention, the VA-VAc copolymer suitable for the cable of the invention shows a degree of hydrolysis which is incomplete, so as to ensure good solubility of this polymer in water, and which is sufficiently high, such that the copolymer hydrophilic properties are sufficient to ensure an adequate degree of interaction with water.

The VA-VAc copolymer described in EP01130960 is suitable for the purposes of the present invention; accordingly, as far as such VA-VAc copolymer is concerned, said application is herein incorporated as a reference.

Examples of commercially available VA-VAc copolymers showing the desired properties are those sold under the trade name Mowiol® (Kuraray), Gohsenol® (Nippon Gohsei), Elvanol® (Du Pont).

Preferably, the first and the second plasticizers are in an amount of about 12–25 and 3–7 parts by weight per hundred parts by weight of the copolymer, respectively.

The preferred plasticizers for realising the cable of the invention are polyhydric alcohols; particularly, the first plasticizer is selected from sorbitol, trimethylolpropane, di-trimethylolpropane, methylpropyl propanediol, and mixtures thereof whereas the second plasticizer is selected from mannitol, pentaerythritol, dipentaerythritol, trimethylolethane, and mixtures thereof.

More preferably, the first plasticizer is trimethylolpropane or di-trimethylolpropane and the second is pentaerythritol or dipentaerythritol; in particular, the first and the second plasticizer are in an amount of about 20 and about 5 parts by weight per hundred parts by weight of said copolymer, respectively.

Further, the above defined water-soluble polymer material comprises a third plasticizer, liquid at room temperature, in an amount of about 0.5–10 parts by weight per hundred parts by weight of the copolymer.

The third plasticizer is, preferably, a polyhydric alcohol; the preferred third plasticizer being selected from glycerol, ethylene glycol, diethylene glycol, triethylene glycol, propylene glycol, dipropylene glycol, tripropylene glycol, trimethylolpropane ethoxylates, pentaerythritol ethoxylates, and mixtures thereof.

Preferably, the third plasticizer is in an amount of 2–7, particularly 5, parts by weight per hundred parts by weight of said copolymer. The most preferred third plasticizer is diethylene glycol or triethylene glycol.

The following table shows the melting points of the preferred first and second plasticizers suitable for the cable of the invention.

| PLASTICIZER | m.p. (° C.) |
|---|---|
| sorbitol | 100 |
| trimethylolpropane | 60 |
| di-trimethylolpropane | 109 |
| methylpropyl propanediol | 60 |
| mannitol | 167 |
| pentaerythritol | 255 |
| dipentaerythritol | 215 |
| trimethylolethane | 200 |

The Applicant has also found that the VA-VAc copolymer comprised in the solid and compact element of the cable of the invention can be protected against the ageing effects caused by hydrolysis phenomena, by adding an effective amount of a hydrolysis stabiliser compound.

In fact, according to another preferred embodiment, the above defined polymer material further comprises a hydrolysis stabilizer compound comprising a chelant group comprising two hydrogen atoms bonded to two respective heteroatoms selected from nitrogen, oxygen and sulfur, said two hydrogen atoms having a distance between each other of from $4.2 \times 10^{-10}$ m to $5.8 \times 10^{-10}$ m, preferably of from $4.5 \times 10^{-10}$ m to $5.5 \times 10^{-10}$ m, said stabilizer compound being present in an amount of at least 0.75 mmoles per 100 g of the VA-VAc copolymer.

The hydrolysis stabiliser described in EP01130960 is suitable for the purposes of the present invention; accordingly, as far as such stabiliser is concerned, said application is herein incorporated as a reference; the most preferred stabiliser is N,N'-esan-1,6-diylbis[3,5-di-ter-butyl-4-hydroxyphenyl)propionamide].

The presence of the stabiliser allows to reduce the increase of the hydrolysis degree of the VA-VAc copolymer upon ageing, thus maintaining the desired water-blocking properties of the VA-VAC copolymer.

The viscoelastic properties of the above defined water-soluble polymer material were measured by oscillatory techniques, applying a stress or strain thereto and working in the so-called "region Of linear strain response".

The water-soluble polymer material was characterised by measuring the phase lag between the applied shear stress and measured shear strain and deriving which component is dominant.

Hooke's law correlates the strain to the stress via a material costant: the modulus; in the oscillation tests, the stress and strain are constantly changing and any number of instantaneous values can be used to obtain the instantaneous value of the viscoelastic or complex modulus $G^*$ according to the following formula:

$$G^* = G' + iG''$$

wherein $G'$ is the elastic modulus, a measure of the elastic storage of energy since the strain is recoverable in an elastic solid, also known as the storage modulus;

$G''$ is the viscous modulus, a measure of the viscous dissipation of energy through permanent deformation in flow, also known as the loss modulus; and $i$ is the imaginary unit of complex numbers.

$G'$ and $G''$ are also related to the phase angle (delta) by the following formula:

$$\tan \delta = G''/G'$$

wherein $G'$ and $G''$ are as above defined.

The Applicant observed that there is an excellent correlation between the complex modulus $G^*$, measured at a frequency of 100 Hz and a temperature of 200° C., and the extrudability properties of the water-soluble polymer material above defined in terms of dimensional stability and regularity.

The extrudability properties of the material, in terms of dimensional stability and regularity, were found and considered to be acceptable when $G^*$ is equal or higher than $2.5 \cdot 10^6$ MPa, preferably between $3.0 \cdot 10^6$ and $4.0 \cdot 10^6$ MPa; the rheological test method was considered to be predictive of said properties because when $G^*$ is lower than $2.5 \cdot 10^6$ MPa, the material molten shape does not show the consistency needed to guarantee said properties for the solid and compact element of the cable of the invention.

The Applicant further noted that $\tan \delta$ well describes the stickiness effects observed during the extrusion test.

Stickiness is due to the material being more viscous and wetting the surface of the other material with which it comes into contact. The degree of stickiness can be expressed by the ratio of $G''$ to $G'$, determined by an oscillation frequency sweep test at $10^{-2}$ Hz.

The stickiness properties between the melt shape of the solid and compact element and the transmission element of the cable of the invention were found and considered to be acceptable when $\tan \delta$ is equal or lower than 2.3, preferably between 0.5 and 2.0. Higher $\tan \delta$s are therefore an index of the stickiness of the water-soluble polymer material and result in potentially damaging the transmission element and, at the same time, do not guarantee the desired and needed stability and regularity thereof upon extrusion, this further potentially giving rise to attenuation phenomena of the transmitted signal, on account of either irregularly distributed pressures on the surface of the transmission element or excessive ringing of the transmission element, both of which being drawbacks which can result in attenuation phenomena of the transmitted signal, even under conditions which would otherwise not be harmful to the functioning of the cable.

The Applicant used the glass transition temperature Tg, measured according to Differential Scanning Calorimetry (DSC), to evaluate the interaction between the VA-VAc copolymer and the plasticizers.

The Tg of the water-soluble polymer material of the cable of the invention was found and considered to be acceptable when close to room temperature, specifically in the range of 20°–35° C., preferably of 25–30° C., because the material has to be neither soft nor brittle in order to be easily handled during the different steps of the making of the cable of the invention.

In fact, if Tg is lower than about 20° C., the material results too soft and, due to the water absorbed by the cable produced with such a material upon ageing, its surface becomes sticky. If, on the other hand, Tg is higher than about 35° C., the material results too brittle, which may cause microfractures damaging the transmitting element of the cable possibly produced with such material.

According to a second aspect, the invention also relates to a method for maintaining loose a transmitting element of a water-resistant telecommunication cable, upon the extrusion thereof, comprising a longitudinal cavity extending along the length of the cable and a solid and compact element housing the transmitting element which comprises preparing the solid and compact element using a water-soluble polymer material comprising:

a vinyl alcohol/vinyl acetate copolymer having a hydrolysis degree of about 60% to about 95% and a polymerisation degree higher than about 1,800;

at least a first solid plasticizer, having a melting point between 50° and 110° C., and a second solid plasticizer, having a melting point equal or higher than 140° C., in an amount of about 10–30 and 1–10 parts by weight per hundred parts by weight of the copolymer, respectively;

the water-soluble polymer material showing:

a complex modulus (G*) equal or higher than $2.5 \cdot 10^6$ MPa;

a ratio of the viscous modulus to the elastic modulus (tan δ) equal or lower than 2.30;

a glass transition temperature (Tg) of about 20° to about 35° C.

According to another aspect, the cable of the invention also relates to the use of a water-soluble polymer material comprising:

a vinyl alcohol/vinyl acetate copolymer having a hydrolysis degree of about 60% to about 95% and a polymerisation degree higher than about 1,800;

at least a first solid plasticizer, having a melting point between 50 and 110° C., and a second solid plasticizer, having a melting point equal or higher than 140° C., in an amount of about 10–30 and 1–10 parts by weight per hundred parts by weight of the copolymer, respectively;

the water-soluble polymer material showing:

a complex modulus (G*) equal or higher than $2.5 \cdot 10^6$ MPa;

a ratio of the viscous modulus to the elastic modulus (tan δ) equal or lower than 2.30;

a glass transition temperature (Tg) of about 20° to about 35° C.;

for the preparation of a solid and compact element of a water-resistant telecommunication cable comprising a longitudinal cavity extending along the length of the cable and the solid and compact element housing a transmitting element for maintaining loose the latter upon extrusion of the cable.

The Applicant observed that the polymer material comprised in the cable of the invention has a consistency of the fuse which allows to maintain the desired extruded shape during the cooling step. Further, the above defined polymer material has the ability to hinder and avoid the penetration of water both as a vapour and a liquid and allows at the same time to regularly carry out its extrusion without noting any interference of the transmission element with the polymer material therefore guaranteeing the absence of any shift from the desired dimension and any possible interruption of the extrusion due to the breaking of the solid and compact element.

The cable of the invention allows to use small plasticizer amounts, this further avoiding any exudation of the plasticizers in time.

The water-soluble polymer material comprised in the cable of the invention is capable of quickly stopping the longitudinal flow of water along said solid and compact element such as buffer tubes. Solid and compact elements of this kind allow to avoid the use, or at least substantially reduce the amount, of conventional water-blocking means, both inert and active, such as grease-like material, water-swellable powders and the like, which is highly desirable when tubular elements containing loosely arranged optical fibres are realised.

Further, the cable of the invention is not subject to microbending phenomena as, adversely it happens when water-swellable powders are in direct contact with the transmission element, this presenting appreciable risks of increasing the attenuation of the transmitted signal, even independently of the presence of moisture.

Still further, the cable of the invention allows to avoid inserting any additional element (such as powders, tapes, foils etc.) into the cable structure, thus omitting the introduction of any additional steps into the cable manufacturing process, as well as any possible cumbersome operations while connecting the cable ends and/or repairing damaged portions of the cable.

For the purposes of the present invention, the expression "solid and compact element" is intended to refer to an element consisting of a material, or a mixture of materials, which, at the working temperatures of the cable (and in the near absence of water), is not fluid, fibrous or pulverulent, and has mechanical properties, such as elastic modulus, breaking load, elongation at break and the like, which are similar to those of conventional polymer materials employed to make the structural elements of the cable, such as, for example, cores, sheaths or tubular elements containing optical fibres. The term "conventional materials" is referred in the present description to those material typically employed in the art for manufacturing the above structural elements and comprise within its meaning, although not being limited to, polymer materials such as polyolefins, for example polyethylene (high, medium and low density PE), polypropylene (PP) or ethylene-propylene copolymers (PEP), polybutylene terephthalate (PBT), polyvinylchloride (PVC) or polyamides (PA).

The solid and compact element comprised in the cable of the invention can comprise more than about 75% of the water-soluble polymer material above defined, this meaning that this solid element can be mainly made of such water-soluble polymer material, with the optional addition of other minor components such as, for example, fillers, plasticizers, pigments, dyes, processing agents, biocides or stabilisers, present in an amount of less than about 25% by weight, preferably less than about 10%.

In the present description, the expressions "water-blocking material" or "water-blocking properties" are intended to refer typically to a material capable of blocking the longitudinal propagation of water inside the cable within a predetermined length of this cable. Preferably, this length is less than or equal to 10 meters.

The expression "water-soluble polymer material" is intended to mean that the water-blocking material used in a cable according to the present invention is capable of at least partially dissolving on contact with water, creating an aqueous solution with a predetermined viscosity value. In particular, the viscosity of the solution which forms upon contact with water will be such that it hinders the flow of said solution in the cable. Preferably, this solution has a viscosity such that it essentially blocks a flow of water which has penetrated into a cavity, within a distance of less than about ten meters from the point of ingress of said water.

For the purpose of the present invention, the term "transmitting element" includes within its meaning any element capable of transmitting a signal, particularly optical fibres, including individual optical fibres, ribbons or bundles of optical fibres, either as such or protected by a polymeric sheath. Non limiting examples of optical fibres are, for example, single-mode fibres, multi-mode fibres, dispersion-shifted (DS) fibres, non-zero dispersion (NZD) fibres, or fibres with a large effective area and the like, depending on the application requirements of the cable. They are generally fibres with an outside diameter of between 230 and 270 μm.

BRIEF DESCRIPTION OF THE DRAWINGS

A better understanding of the present invention will result from the following detailed description with reference to the attached drawings, wherein.

DETAILED DESCRIPTION OF THE INVENTION

Figure 1:
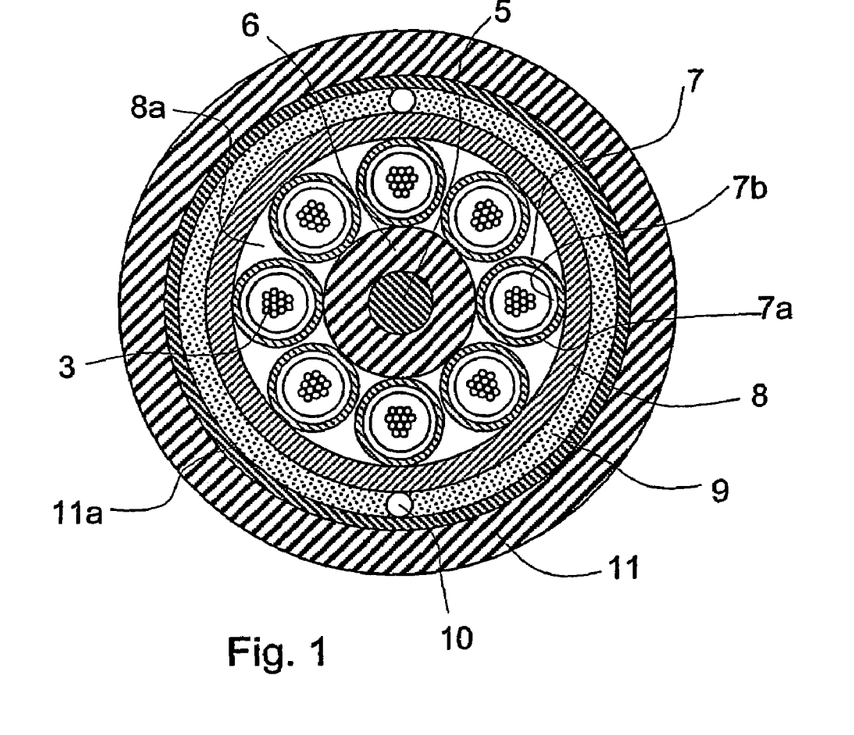
FIG. 1 is a schematic cross section of an example of an optical fibre cable according to the invention, of the type containing a tubular element with a central support.

A cable of the so-called tubular element type, in particular of the loose tube type, as represented in FIG. 1, has, in the radially innermost position, a supporting element comprising a reinforcing element, typically made of glass resin (5), coated with a layer (6) of polymer, up to a given diameter.

The cable has one or more tubular elements or tubes (7), wound around the supporting element (5) and around its coating layer (6), inside which are located the optical fibres (3) arranged individually, or assembled in bundles, ribbons, mini-tubes (i.e. a micro-sheath surrounding a bundle of optical fibres) and the like.

The number of tubular elements present (which may also be arranged on several layers) and the dimensions of these tubular elements depend on the intended capacity of the cable, as well as on the conditions of use of this cable.

For example, cables are envisaged with only one tubular element (in which case the central element (5) and its coating (6) is not present), and cables are envisaged with six, eight or more tubular elements, wound in one or more layers (for example up to 24 tubular elements bundled on two layers).

The tubular elements (7) are in turn held together in a containing layer (8) made, for example, by wrapping, and are preferably combined with a reinforcing element (9), for example a layer of Kevlar® fibres or of glass yarn, the size of which depends on the mechanical strength requirements of the cable.

Two sheath-dividing filaments (10), arranged longitudinally with respect to the cable, can be included within the reinforcing layer (9).

Lastly, the cable comprises a protective outer sheath (11), typically made of polyethylene. In relation to specific requirements, further protective layers can also be present, for example of metal layers, either inside or outside the structure described.

According to one illustrative embodiment of the present invention, in a cable with the structure described above, the tubular elements (7) can be made with a double-layer wall, in which the inner layer (7b) is made of the above defined water-soluble polymer material with water-blocking properties and the outer layer (7a) is made of a conventional material such as polybutylene terephthalate (PBT), polypropylene (PP), polyethylene (PE) or ethylene-propylene copolymer (PEP).

Figure 2:
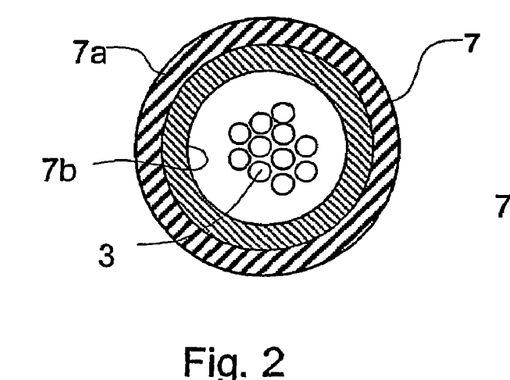
FIG. 2 is a cross section of a tubular element of a cable according to the invention, with a two-layer coating containing optical fibres.

FIG. 2 shows a tubular element (7) with a two-layer wall (produced, for example, by co-extrusion), the outermost of which (7a) being made from a conventional polymer material (e.g. PE, PP, PEP or PBT) while the innermost (7b) being made from the water-soluble polymer material. The space inside the tube, not occupied by the optical fibres, is typically empty.

One or more optical fibres (3) are arranged inside the tubular element, typically loosely, separate or assembled in the form of fibre ribbons, mini-tubes or the like.

The material forming the inner layer (7b) of the tubular element is a solid extrudable material with mechanical properties more or less similar to those of the outer layer (7a), such that, preferably, the thickness of the entire tubular element is not dissimilar to the typical thickness of a tubular element with a single conventional layer.

Typically, for example, a tubular element with an outside diameter of 3 mm can have a wall with a total thickness of about 0.6–0.7 mm, divided in almost equal parts between the inner water-soluble layer (7b) and the outer conventional layer (7a).

Figure 3:
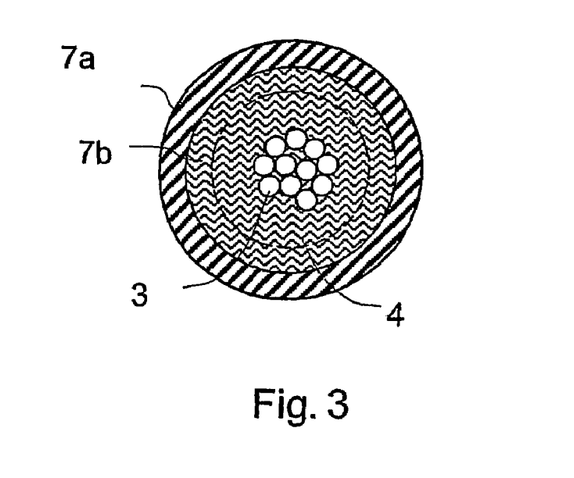
FIG. 3 is the same cross section of the tubular element as FIG. 2, after the ingress of water.

In the case of accidental ingress of water, the water-soluble polymer material of the inner layer (7b) of the two-layer tubular element dissolves at least partly in the penetrating water, starting from the original position (represented by the dashed line in the figure), as shown in FIG. 3, forming a viscous solution (4) which moves between the fibres, thus filling the free spaces (generally of irregular outline), independently of their shape, until the entire free cross section of the tubular element has been occluded.

The aqueous solution thus formed has a viscosity which is sufficiently high to hinder the subsequent propagation of water along the cable, until this propagation is blocked within a few meters from the point of ingress of the water.

In this way, without introducing additional materials into the tubular element, such as powders, blocking fluids and the like, which would involve, inter alia, a substantial increase in the weight of the cable, blockage of the propagation of water which has accidentally penetrated into the cable is obtained.

Where appropriate, one can envisage to make an outer layer of the tubular elements (7) with the water-soluble polymer material, or alternatively the entire tubular element can be made of such material.

If desired, the containing layer (8), can be made (entirely or partly) by wrapping with a compact tape of solid, water-soluble polymer material, or alternatively with an extruded layer of the same material.

The presence of layers of solid, water-soluble polymer material in the layers (6) and (8) and the size of said solid, water-soluble polymer material present in these layers are determined by the free cross sections present [for example the star-shaped areas (8a)] and by the requirements for blocking the flow of water in the cable in more or less narrow spaces.

The Applicant has observed that, in a cable according to the present invention, as the viscosity of the solution formed from the water-soluble polymer material upon contact with water increases, it is possible to increase the dimensions of the cavity within which the blocking of water must take place and/or reduce the time taken to block this flow of water.

The Applicant has moreover observed that the water-soluble polymer material to make a cable according to the present invention forms upon contact with water, an aqueous solution which substantially increases its viscosity over time, until a gel is produced which further contributes to maintaining the water-blocking condition over time.

The Applicant has observed that in order to obtain the desired solubility, it is preferable for the water-soluble polymer material not to be crosslinked, so that the various macromolecules are relatively independent from one another, to allow the water to dissolve sufficient amounts of the polymer material.

Among the solid, water-soluble polymer materials which can be used in a cable according to the present invention, the preferred ones are those which, up to relatively high relative humidity (R.H.) values, typically about 75–80%, absorb only modest amounts of water, typically less than about 25% by weight of the amount which can be absorbed by the material under saturation conditions (R.H.=100%).

This property of the material is particularly advantageous since, as the optical fibres are relatively insensitive to the presence of water vapour up to relative humidity values of less than about 75–80%, below these values it is advantageous for the water-soluble polymer material to be more or less unchanged.

The fact that the material is virtually insensitive at these relatively low relative humidity values allows a better processability and fewer problems of storage of the finished product, since it is not necessary to protect it against ambient humidity, which is generally less than 75%.

In addition, by virtue of this property, the material remains almost entirely available to block water in the event of an ingress of liquid water or an increase in the relative humidity beyond the critical threshold, without any part of this material having needlessly interacted with the water in the vapour state below the critical threshold for the relative humidity, or even needlessly undergoing swelling so as to result in any undesired squeezing of the transmission elements.

The Applicant has moreover observed that, among the water-soluble polymer materials which can be used in a cable according to the present invention, it is particularly advantageous to use materials which, when placed in a housing which contains optical fibres, give this housing hygrostatic properties. The reason for this is that when the environment outside the cable structure in which the transmission elements are housed (for example a tubular element of plastic material) exceeds the relative humidity critical threshold (75–80%), a material according to the present invention placed inside the cable structure in an adequate amount is capable of maintaining, around the transmission elements, relative humidity values which are lower than the critical values.

The presence, inside the cable structure, of further elements made essentially of the water-soluble polymer material of the invention, such as, for example, interstitial tapes or filaments, can further increase the time to reach the relative humidity critical threshold.

In order to evaluate a water-soluble polymer material which can be used in a cable according to the present invention, the Applicant has developed the following tests.

A first test consists in producing, by extrusion, a tubular element with an outside diameter of 2.6 mm, with a double layer of material and containing 12 optical fibres having a diameter of 250 µm, consisting in an outer layer of polyethylene about 0.25 mm thick and an inner layer of water-soluble polymer material about 0.25 mm thick.

A conventional co-extrusion line for manufacturing a buffer tube containing 12 optical fibres comprises twelve reels from which the optical fibres are taken and sent to a common extruder head through which the water-soluble polymer material is extruded around them forming a tube. The tube is then sent to a cooling device and from there to a stretching device and then to a final collection reel. Optionally, the extrusion line can comprise an additional pulley arranged between the stretching element and the extruder.

The fibres and the polymer material buffer tube enclosing them, proceed for a certain length along the extrusion line each independently from the others. The dimensional stability of the molten state of the water-soluble polymer material and the stickiness phenomena can be observed between the extrusion head and the final collection reel.

According to a second test, plates of the above defined water-soluble polymer material (having a diameter of about 25 mm and being 0.5 mm thick) are moulded at 200° C. and put between two parallel plates of a rotational rheometer for the Theological characterization to determine G* and tan δ at different shear rates.

To determine the region of linear strain response, an amplitude sweep test has to be run at a fixed frequency close to the phenomena investigated ($10^{-2}$ Hz) and slowly increasing the applied stress (stress range: 0.1–5000 Pa; delay time: 2 sec), verifying that the measured viscoelasticity values remain constant.

G* and tan δ are then measured by a frequency sweep at a constant stress (100 Pa) from $10^{-3}$ to $10^2$ Hz (delay time: 1 sec) at 200° C.

According to a third test, the glass transition temperature Tg is measured according to Differential Scanning Calorimetry (DSC). Operating with a Perkin Elmer DSC, Series 7, a sample of about 20 mg, in a first step, is heated to erase the thermal history thereof and, in a second step, the Tg is measured at a heating rate of 20° C./min.

The above defined water-soluble polymer material can be used in several different ways in the various components which form the structure of the cable of the invention, so as to optimise the water-blocking effect.

It is possible, f.i., to make optical cables such as mini-tube cable, wherein two or more optical fibres are contained in a microsheath (about 0.07–0.15 mm thick) which can advantageously be formed from the water-soluble polymer material according to the invention, a number of such mini-tubes being in turn housed into a larger diameter buffer tube.

It is particularly advantageous to make an optical fibre cable housing said water-soluble polymer material, such that the dissolution of the latter brings it into contact with the optical fibres, thus blocking the flow of water along the cavity in which these fibres are housed. The viscous solution formed following the accidental ingress of water into the cable fills the interstitial spaces, thus blocking the flow, avoiding the fibres to experience any significant mechanical stresses. This allows the cable, following accidental ingress of water, to nevertheless remain functional without experiencing any particular drawbacks in terms of attenuation of the signal, thereby allowing its repair to be carried out at a later time.

The manufacturing of the various elements mentioned above, made of or incorporating the water-soluble polymer material above defined, can be carried out according to the known techniques, preferably by extrusion.

The following examples illustrate the invention without limiting it.

EXAMPLE 1

Preparation of the Water-soluble Polymer Material

Table 1 herebelow reports the detailed composition for any of the water-soluble polymer materials exemplified hereinafter, which were prepared feeding the blend of the VA-VAc copolymer with the plasticizers using a gravimetric feeder into a 40 mm co-rotating twin-screw extruder 35L/D, possibly injecting, where appropriate, the liquid plasticizer, at the following operating conditions: screw speed 150 rpm, production rate 30 kg/h, melt temperature at the extruder exit 200° C. The strands were air cooled and granulated into pellets.

TABLE 1

| POL. MAT. | VA-VAc COPOLYMER TRADENAME | Polym. degree | DEG (other) | TMP | PENTA |
|---|---|---|---|---|---|
| 1 | Mowiol 26/88 | 3,300 | — | 20 | 5 |
| 2 | Mowiol 26/88 | 3,300 | (2 di-PENTA) (30 di-TMP) | — | — |
| 3 | Mowiol 26/88 | 3,300 | (12 di-TMP) | — | 10 |
| 4 | Mowiol 26/88 | 3,300 | (15 di-TMP) | 15 | 10 |
| 5* | Mowiol 8/88 | 1,400 | — | 9 | 3 |
| 6* | Mowiol 15/79 | 1,900 | (6 GLY) | — | 12 |
| 7* | Mowiol 26/88 | 3,300 | (10 PEG) | — | 15 |
| 8 | Mowiol 26/88 | 3,300 | 1 | 15 | 5 |
| 9 | Mowiol 26/88 | 3,300 | 5 | 15 | 5 |
| 10 | Mowiol 26/88 | 3,300 | 7 | 15 | 5 |
| 11* | Mowiol 26/88 | 3,300 | 5 | 5 | 15 |
| 12 | Mowiol 26/88 | 3,300 | 3 | 15 | 5 |
| 13 | Mowiol 26/88 | 3,300 | 5 | 15 | 1 |
| 14 | Mowiol 26/88 | 3,300 | 5 | 15 | 3 |
| 15 | Mowiol 26/88 | 3,300 | 5 | 14 | 5 |
| 16 | Mowiol 26/88 | 3,300 | 4 | 13 | 4 |
| 17 | Mowiol 26/88 | 3,300 | 6 | 17 | 5 |

DEG = diethylene glycol;
TMP = trimethylol propane;
di-TMP = di-trimethylol propane;
PENTA = pentaerythritol;
di-PENTA = di-pentaerythritol;
GLY = glycerine;
PEG = polyethylene glycol;
the plasticizer amounts are expressed as parts per hundred parts of the VA-VAc polymer;
*= comparative

EXAMPLE 2

Evaluation of the Melt Consistency

Plates, having a diameter of about 25 mm and being 0.5 mm thick, of the pellets of the water-soluble polymer materials 1–10, prepared according to example 1, were moulded at 200° C. and put between two parallel plates of a rotational rheometer for the rheological characterization to determine G* and tan δ at different shear rate.

All the tests were carried out on a Bohlin Cvo 120 stress control rheometer at a temperature of 200° C.

To determine the region of linear strain response, an amplitude sweep test was run applying a stress range of 0.1 to 5000 Pa (delay time: 2 sec) at $10^{-2}$ Hz (geometry PP25; gap 500 μm), slowly increasing the applied stress and verifying that the measured viscoelasticity values remain constant.

G* and tan δ were then measured by a frequency sweep at a constant stress (100 Pa) from $10^{-3}$ to $10^2$ Hz (delay time: 1 sec) at 200° C.

The melt consistency of the extruded fuse was evaluated by the measure of the complex modulus G* at a frequency of $10^2$ Hz; the data obtained are reported in Table 2.

TABLE 2

| Polymer material | G* (MPa) |
|---|---|
| 1 | $3.5\ 10^6$ |
| 2 | $3.3\ 10^6$ |
| 3 | $3.6\ 10^6$ |
| 4 | $2.5\ 10^6$ |
| 5* | $2.1\ 10^6$ |
| 6* | $2.4\ 10^6$ |
| 7* | $3.5\ 10^6$ |
| 8 | $3.3\ 10^6$ |
| 9 | $3.3\ 10^6$ |
| 10 | $3.3\ 10^6$ |

*- comparative

Although the polymer material 7 showed an excellent stability of the fuse, it came out indeed to be sticky as it resulted by detecting its tan δ (data shown in the table 3 herebelow).

EXAMPLE 3

Evaluation of the Interference of the Optical Fibres with the Buffer Tube

The interference between the optical fibres and the buffer tube surface during the extrusion thereof was evaluated by measuring the tan δ, at a frequency of $10^{-2}$ Hz, of the polymer materials 1–11; the data obtained are reported in the following table.

TABLE 3

| Polymer material | tan δ |
|---|---|
| 1 | 1.81 |
| 2 | 2.22 |
| 3 | 1.67 |
| 4 | 2.30 |
| 5* | 2.40 |
| 6* | 2.46 |
| 7* | 2.40 |
| 8 | 1.90 |
| 9 | 1.96 |
| 10 | 1.99 |
| 11* | 2.40 |

*- comparative

Further, a double layer tubular element (outer diameter 2.6 mm) containing 12 optical fibres having a diameter of 250 μm, was produced, by extrusion, for each of the water-soluble polymer materials shown in Table 3, the outer layer being of polyethylene and the inner layer being of the selected water-soluble polymer material, both layers being about 0.25 mm thick.

The tubular elements made with the polymer materials 1–4 and 8–10 did not show any stickiness, adversely to the elements comprising the polymer materials 5–7 and 11, coherently with the tan δ data illustrated in table 3 above, this showing evidently the meaningfulness of tan δ to evaluate the visco-elastic characteristics of the water-soluble polymer material comprised in the solid and compact element of the cable of the invention.

EXAMPLE 4

The glass transition temperature Tg was measured on the pellets of the polymer materials 1–10 and 12–17, prepared as described in example 1, according to Differential Scanning Calorimetry (DSC).

Operating with a Perkin Elmer DSC, Series 7, a sample of about 20 mg, in a first step, was heated to erase the thermal history thereof and, in a second step, the Tg was measured at a heating rate of 20° C./min, as shown in the following table.

TABLE 4

| Polymer material | Tg (° C.) |
|---|---|
| 1 | 33 |
| 2 | 27 |
| 3 | 35 |
| 4 | 21 |
| 5* | 34 |
| 6* | 30 |
| 7* | 31 |
| 8 | 35 |
| 9 | 27 |
| 10 | 21 |
| 12 | 25 |
| 13 | 36 |
| 14 | 27 |
| 15 | 28 |
| 16 | 34 |
| 17 | 20 |

*- comparative

The polymer materials 5–7 did neither show brittleness nor softness although they resulted to be sticky as illustrated in the example 2 hereabove.

On the basis of above data, it can be noted that only the polymer materials as above defined to be suitable for the cable of the invention came out to be able to guarantee an excellent dimensional stability as well as the absence of any interaction of the VA-VAc copolymer with the plasticizers and, at the same time, no stickiness upon extrusion.

The invention claimed is:

1. A water-resistant telecommunication cable comprising a longitudinal cavity extending along the length of the cable and a solid and compact element housing at least one transmitting element, wherein the solid and compact element is associated with the cavity and comprises a water-soluble polymer material comprising:
a vinyl alcohol/vinyl acetate copolymer having a hydrolysis degree of about 60% to about 95% and a polymerisation degree higher than about 1,800;
at least a first solid plasticizer, having a melting point between 50° and 110° C., and a second solid plasticizer, having a melting point equal or higher than 140° C., in an amount of about 10–30 and 1–10 parts by weight per hundred parts by weight of the copolymer, respectively;
the water-soluble polymer material showing:
a complex modulus (G*) equal or higher than $2.5 \cdot 10^6$ MPa;
a ratio of the viscous modulus to the elastic modulus (tan δ) equal or lower than 2.30; and
a glass transition temperature (Tg) of about 20° to about 35° C.

2. The cable according to claim 1, wherein the solid and compact element comprises about 30% by weight or more of the water-soluble polymer material.

3. The cable according to claim 1, wherein the solid and compact element comprises about 50% by weight or more of the water-soluble polymer material.

4. The cable according to claim 1, wherein the solid and compact element comprises about 75% by weight or more of the water-soluble polymer material.

5. The cable according to claim 1, wherein the solid and compact element is a structural element of the cable.

6. The cable according to claim 5, wherein the structural element is a tubular element comprising at least one sheath made of the water-soluble polymer material, and wherein the cavity is defined by the inner volume of the tubular element.

7. The cable according to claim 6, wherein the tubular element is a single sheath completely made of the water-soluble polymer material.

8. The cable according to claim 6, wherein the tubular element is a double layer sheath having an inner layer made of the water-soluble polymer material and an outer layer made of a water-insoluble polymer material.

9. The cable according to claim 6, wherein the tubular element is a three-layer sheath, having inner and outer layers made of the water-soluble polymer material and an intermediate layer being made of a water-insoluble polymer material.

10. The cable according to claim 1, wherein the solid and compact element is a buffer tube and the transmitting element is an optical fibre.

11. The cable according to claim 1, wherein the copolymer comprises about 50% to about 95% of the total weight of the water-soluble polymer material.

12. The cable according to claim 1, wherein the copolymer comprises about 60% to about 85% of the total weight of the water-soluble polymer material.

13. The cable according to claim 1, wherein the copolymer has a hydrolysis degree of from about 70% to about 92% and a polymerisation degree of about 2,500 to 3,700.

14. The cable according to claim 1, wherein the copolymer has a polymerisation degree of about 3,000 to 3,500.

15. The cable according to claim 1, wherein the first and the second plasticizers are present in an amount of about 12–25 and 3–7 parts by weight per hundred parts by weight of the copolymer, respectively.

16. The cable according to claim 1, wherein the first and second plasticizers are polyhydric alcohols.

17. The cable according to claim 1, wherein the first plasticizer is selected from sorbitol, trimethylolpropane, di-trimethylolpropane, methylpropyl propanediol, and mixtures thereof, and the second plasticizer is selected from mannitol, pentaerythritol, dipentaerythritol, trimethylolethane, and mixtures thereof.

18. The cable according to claim 1, wherein the first plasticizer is trimethylolpropane or di-trimethylolpropane and the second plasticizer is pentaerythritol or dipentaerythritol.

19. The cable according to claim 1, wherein the first and the second plasticizer are present in an amount of about 20 and about 5 parts by weight per hundred parts by weight of said copolymer, respectively.

20. The cable according to claim 1, wherein the water-soluble polymer material further comprises a third plasticizer, which is liquid at room temperature, in an amount of about 0.5–10 parts by weight per hundred parts by weight of the copolymer.

21. The cable according to claim 20, wherein the third plasticizer is a polyhydric alcohol.

22. The cable according to claim 20, wherein the third plasticizer is selected from glycerol, ethylene glycol, diethylene glycol, triethylene glycol, propylene glycol, dipropylene glycol, tripropylene glycol, trimethylolpropane ethoxylates, pentaerythritol ethoxylates, and mixtures thereof.

23. The cable according to claim 20, wherein the third plasticizer is present in an amount of 2–7 parts by weight per hundred parts by weight of said copolymer.

24. The cable according to claim 20, wherein the third plasticizer is present in an amount of 5 parts by weight per hundred parts by weight of said copolymer.

25. The cable according to claim 20, wherein the third plasticizer is diethylene glycol or triethylene glycol.

26. The cable according to claim 1, wherein complex modulus (G*) is between $3.0\ 10^6$ and $4.0\ 10^6$ MPa.

27. The cable according to claim 1, wherein tan δ is between 0.5 and 2.0.

28. The cable according to claim 1, wherein Tg is between 25° and 30° C.

29. The cable according to claim 1, wherein the water-soluble polymer material comprises a hydrolysis stabilizer compound comprising a chelant group comprising two hydrogen atoms bonded to two respective heteroatoms selected from nitrogen, oxygen and sulfur, said two hydrogen atoms having a distance between each other of from $4.2 \times 10^{-10}$ m to $5.8 \times 10^{-10}$ m, said stabilizer compound being present in an amount of at least 0.75 mmoles per 100 g of the copolymer.

30. The cable according to claim 29, wherein the stabiliser is N,N'-esan-1,6-diylbis[3,5-di-ter-butyl-4-hydroxyphenyl) propionamide].

31. A method for maintaining loose a transmitting element of a water-resistant telecommunication cable, upon the extrusion thereof, comprising a longitudinal cavity extending along the length of the cable and a solid and compact element housing the transmitting element which comprises preparing the solid and compact element using a water-soluble polymer material comprising:

a vinyl alcohol/vinyl acetate copolymer having a hydrolysis degree of about 60% to about 95% and a polymerisation degree higher than about 1,800;

at least a first solid plasticizer, having a melting point between 50° and 110° C., and a second solid plasticizer, having a melting point equal or higher than 140° C., in an amount of about 10–30 and 1–10 parts by weight per hundred parts by weight of the copolymer, respectively;

the water-soluble polymer material showing:

a complex modulus (G*) equal to or higher than $2.5\ 10^6$ MPa;

a ratio of the viscous modulus to the elastic modulus (tan δ) equal to or lower than 2.30; and a glass transition temperature (Tg) of about 20° to about 35° C.

32. A solid and compact element of a water-resistant telecommunication cable comprising a longitudinal cavity extending along the length of the cable and the solid and compact element housing a transmitting element for maintaining loose the latter upon extrusion of the cable, prepared from a water-soluble polymer material, comprising:

a vinyl alcohol/vinyl acetate copolymer having a hydrolysis degree of about 60% to about 95% and a polymerisation degree higher than about 1,800;

at least a first solid plasticizer, having a melting point between 50° and 110° C., and a second solid plasticizer, having a melting point equal or higher than 140° C., in an amount of about 10–30 and 1–10 parts by weight per hundred parts by weight of the copolymer, respectively;

the water-soluble polymer material showing:

a complex modulus (G*) equal to or higher than $2.5\ 10^6$ MPa;

a ratio of the viscous modulus to the elastic modulus (tan δ) equal to or lower than 2.30; and a glass transition temperature (Tg) of about 20° to about 35° C.

* * * * *